United States Patent Office 3,435,899
Patented Apr. 1, 1969

3,435,899
DELAYED GELLING OF SODIUM SILICATE AND USE THEREFOR
Homer C. McLaughlin and Joseph Ramos, Duncan, Okla., assignors to Halliburton Company, Duncan, Okla., a corporation of Delaware
No Drawing. Filed Apr. 24, 1967, Ser. No. 632,929
Int. Cl. E21b 33/13
U.S. Cl. 166—292                                22 Claims

ABSTRACT OF THE DISCLOSURE

A liquid sealing composition having a delayed gel time is formed by adding to a sodium silicate solution, a complexed polyvalent metal. Slow release of the polyvalent metal ion from the complex results in a delayed setting or gelling of the sodium silicate solution. Release of the polyvalent metal ion may be achieved by use of a material which will destroy the complex so that polyvalent metal ion is liberated at the desired time. Release of the polyvalent ion may also slowly occur from some complexes without the necessity of adding a complex destroyer.

Background of the invention

This invention relates to a new and improved method and composition for plugging or sealing subterranean earth formations comprising the use of sodium silicate solutions having a controlled gel time. More particularly, this invention relates to sodium silicate solutions catalyzed by a polyvalent ion which is released slowly into the sodium silicate solution.

Various types of materials have been used in oil wells to seal geological formations therein. Portland cement is one of the more common sealing agents used in oil wells. Some degree of success has been achieved using portland cement; however, there are numerous applications where such cement is ineffective. In sealing a formation, a technique known as "squeeze cementing" is often used. In performing squeeze cementing the slurry of portland cement is placed opposite the formation to be sealed and sufficient hydraulic pressure is applied to force the slurry into the formation. As the channels in the formation to be sealed are usually fine capillaries, they are too small to accept cement particles. The hydraulic pressure applied thus causes the formation to "break down" or fracture. With a split or opening of the formation under pressure, a sheet of portland cement slurry fills the crack formed and the capillary system of the formation is left essentially intact and unplugged. Other materials such as plasters, pitches, swelling gruels, grain, etc., fail to seal the formation capillaries, in a manner similar to the portland cement. Emulsions are rarely successful because of their inherent resistance to capillaries caused by the "Jamin effect."

The material used as a sealing agent must be a true fluid which is capable of entry and flow in capillaries, and which upon solidification, plugs or seals the capillaries occupied. The true fluid can be either a pure liquid or a solution.

Sodium silicate is a true fluid which is capable of sealing geological formations, but has previously been used with little or no success. Some of these prior art methods of sealing or plugging with sodium silicate are disclosed in U.S. Patents Nos. 2,236,147, 2,198,120 and 2,330,145.

Sodium silicate is a complicated system of various molecular weight silica polymers in an alkaline solution. Aside from requiring a certain minimum amount of alkalinity, sodium silicate has no definite chemical combining numbers.

Sodium silicate may be caused to form a gel which will seal an underground formation or plug capillaries by the addition of polyvalent ions such as $Ca^{++}$, $Fe^{+++}$, $Cr^{+++}$, $Cu^{++}$, etc. However, the addition of salts such as $CaCl_2$, $Fe_2(SO_4)_3$, $Cr(NO_3)_3$, $CuSO_4$, etc., will cause essentially immediate gelation which allows no time to pump the solution into the formation. Thus, a "two-shot" system must be used wherein the sodium silicate and polyvalent ion solutions are independently pumped into the formation. Such "two-shot" systems are undesirable because they require added time and pumping equipment, it is difficult to obtain proper mixing in the formation, etc. Thus, it is desired to have a one-shot system wherein all of the ingredients are contained in a single solution.

It is therefore an object of this present invention to provide a composition and method for sealing subterranean earth formations employing sodium silicate solutions.

It is a further object of the present invention to provide a delayed setting time for sodium silicate solutions containing polyvalent metal ions.

These and other objects of the present invention will be more readily understood from a reading of the following specification and reference to the examples forming a part thereof.

Summary of the invention

Briefly, this invention comprises a sodium silicate solution containing a polyvalent ion complex which will decompose or break down to release the polyvalent ion slowly. In some cases, it may be necessary to include a material which slowly destroys the complex and thus liberates the polyvalent ion. However, there are some complexes which slowly release polyvalent ion without the necessity of a complex destroying material. Thus both types of complexes may be used within the scope of the present invention.

Description of the preferred embodiments

Any complex that will tie up the polyvalent ion and prevent it from causing a setting or gelling of the sodium silicate until a complex destroyer is added to liberate the polyvalent ion may be used in this invention. Illustrative of the complexes which may be used are $K_3Fe(CN)_6$, $Cr(NH_4)_6(NO_3)_3$, $Cu(NH_3)_4SO_4$, $K_3Cr(CNS)_6$, $(Cr(NH_3)_5NO_2)Cl_2$ $NaTiCl_6$, $Zn(NH_4)_2(NO_3)_2$, $Mg(MnO_4)_2$, etc. A large number of complex ions of polyvalent metals exist and are well known to those skilled in the art as illustrated by Moeller, Inorganic Chemistry (1951), pages 227–46, which is hereby incorporated herein by reference.

The compounds listed above are inorganic; the use of organic ligands is not outside the scope of this invention. Examples of such organic mono, di, tri, and multidentate ligands are: oxalate, ethyl amine, ethylene diamine, diethylene triamine, tetraethylene pentamine, ethylenediamine tetraacetic acid, glycine, dimethyl glyoxine, acetylacetone, thiourea, alpha,alpha'-dipyridyl and thiocyanate. In general, the bonding atoms, either singly or as parts of a ligand, are C, N, O, F, Cl, Br, I, P, S, and As. Some di or multivalent ions usable in complexes are: divalent Ca, V, Fe, Co, Ni, Cu, Zn, Pd, Pt, Ag, Cd; trivalent C, Al, Sc, Cr, Fe, Co, Os, Ir, Au; and tetravalent Pt, Pd. It is conceivable that most of the metallic elements including the rare earths could be made to serve the part in this invention. However, for economic practicability, precious metals, such as Au, Ag, and Pt, and non-commercial metals are of academic interest mainly.

Solutions of the complexes are incorporated into the sodium silicate to be used as the chemical grout. A complex destroyer may also be incorporated into the composition. The complex destroyer must be selected so that it will slowly destroy the complex. If destruction of the complex is too rapid, setting of the sodium silicate will occur before it can be introduced into its intended environment. Therefore, the nature and/or concentration of the complex destroyer should be such that it liberates the polyvalent ion slowly. Of course, the nature of the complex destroyer will vary with the type of complex selected. Those skilled in the art are familiar with various materials which will complex polyvalent ions and also the materials which will destroy these complexes. The ammonia containing complexes, called ammine complexes, have been found to be particularly suitable in practicing this invention.

Complex destroyers are selected from chemicals that will react with the complex ligand in such a manner that the ligand can no longer participate in the complex. When the ligand is sufficiently crippled by the complex destroyer, the naked or partially stripped polyvalent ion can now be seized by the silicate ion starting gelation of the solution. The chemicals containing carbonyl groups, aldehydes, and ketones, are useful complex destroyers. Aldehydes are good complex destroyers for ammonium and certain ammine complexes. Examples of usable aldehydes would be formaldehyde, acetaldehyde, propionaldehyde, glutaraldehyde, propanediol, hydroxyethanol, and sodium 4-benzaldehyde-sulfonate. Ketones are less reactive but such compounds as acetone can prove useful for high temperature applications.

Oxidizing agents are good complex destroyers. Strong oxidizing agents such as permanganates, chromates, peroxides, perchlorates and nitrates are applicable but the chromates and permanganates do not perform sufficiently well for normal commercial application. The chromates and permanganates have a side effect of liberating chromium and manganese ions. Thus the double action of the complex destroyer (itself a complex) and a complex (in this case a complex destroyer also) mutually destroying complexes and liberating multivalent cations is manifested. Peroxides such as hydrogen peroxide, and the persulfates are particularly useful because they function more readily in the alkaline sodium silicate medium. Sodium persulfate will be used later as an example; however, other cations can substitute for sodium such as potassium, ammonium, guanidine, etc.

A particularly suitable complex destroyer which is effective in destroying the complexes set forth above at a rate such that introduction of the polyvalent ion into sodium silicate will occur slowly, is formaldehyde. Formaldehyde may be introduced as it is, in a combination with some other material, or as a material which will decompose in the sodium silicate solution to release the formaldehyde. Examples of formaldehyde sources are a urea formaldehyde such as U.F. 85 (a urea formaldehyde resin commercial available from the Allied Chemical Company), formalin, paraformaldehyde, etc.

Gel time can be controlled by varying the concentration of the complex and also by varying the concentration of the complex destroyer used. The concentration of the complexed polyvalent metal may vary from about 0.02 to 1 mol/liter of silicate solution or higher. The complex destroyer concentration will depend upon its strength and the strength of the complex. However, in general, a concentration of about 0.1 to 10% by weight may be used. For a relatively constant complex concentration, increasing the ratio of complex destroyer to complex will decrease the gel time. Thus, the sodium silicate solution containing the polyvalent ion complex and the complex destroyer can be tailored to produce the gel time desired.

Setting of the silicate may be caused by the liberated polyvalent ion, acidic fragments of the destroyed complex or acidic materials resulting from the complex destroyer.

Rather than using a complex which requires a complex destroyer to liberate the polyvalent ion, a complex can be used which slowly liberates the polyvalent ion without the necessity of having a complex destroyer present. An example of such a complex is that formed between a carbohydrate and ions of Mg, Zn, Cd, Ca, etc. An effective complex is formed between a calcium salt such as CaO, $CaCO_3$, $CaCl_2$, etc., and dextrose or sucrose. In general, any polyvalent ion-carbohydrate complex may be used. The complex may be destroyed by an oxidizing agent such as $Na_2S_2O_8$. However, the carbohydrate complex has only moderate stability and thus the presence of a complex destroyer is not necessary.

Other complexing materials which may be used include mannitol, sodium ethylene-diaminetetraacetate, nitrilotriacetic acid, formamide, urea, and ethylacetate may be used in combination with dextrose or sucrose.

Any suitable sodium silicate may be used in the practice of the present invention. An example of a particularly suitable sodium silicate solution is 41° Bé sodium silicate solution (e.g., Diamond Alkali Grade 40 or Pennsylvania Quartz N brand).

The sodium silicate solution of this invention may be used to seal underground formations in a manner similar to that disclosed in McLaughlin et al. application, Ser. No. 511,141, filed Dec. 2, 1965, and entitled Method of Plugging or Sealing Formations, and now U.S. Patent No. 3,375,872; the disclosure of which is hereby incorporated by reference. In general, the sodium silicate solution of this invention may be used in any application where it is desired to form a delayed setting gel from a liquid.

The invention can be more fully understood by reference to the following examples.

Example I

The effect of formaldehyde concentration and complex concentration on gel time and relative gel strength was explored. The sodium silicate used was 40 Grade sodium silicate. The copper complex was made by mixing 180 gms. of $CuSO_4 \cdot 5H_2O$, 450 ml. $H_2O$, 420 ml. 28% $NH_4OH$ solution and enough water to make 1000 ml. of the tetramminecopper (II) sulfate solution. The formaldehyde was added as a 37% solution of formaldehyde. To the silicate, copper complex and formaldehyde mixture, enough water was added to make 100 ml. final volume. The test temperature was 75° F. The gel time and relative strength of the gel was measured. The results are set forth in Table I. The gel having a strength of 1 was the strongest and compared with paraffin. The 10 gel was mushy but was strong enough to suspend a stirring rod.

TABLE I

| Run No. | 37% Formaldehyde,[1] ml. | Copper Solution, ml. | Gel Time, min. | Relative Gel Strength |
|---|---|---|---|---|
| 1 | 5 | 25 | 19 | 7 |
| 2 | 7½ | 25 | 8½ | 5 |
| 3 | 10 | 25 | 5 | 4 |
| 4 | 12½ | 25 | 3 | 2 |
| 5 | 15 | 25 | (²) | 1 |
| 6 | 7½ | 5 | (³) | 10 |
| 7 | 7½ | 10 | 134 | 9 |
| 8 | 7½ | 15 | 62 | 8 |
| 9 | 7½ | 20 | 15 | 6 |
| 10 | 7½ | 30 | 3 | 3 |

[1] The 37% formaldehyde solution used in this and subsequent tables is 37% by weight formaldehyde in a water-methanol solvent. This mix is commonly called formalin.
[2] 1 minute 10 seconds.
[3] Overnight.

Example II

This example illustrates the use of various latent sources of formaldehyde. U.F. 85 is a urea formaldehyde available from the Allied Chemical Company. The test was performed using the method set forth in Example I. The results are given in Table II.

The gels formed with the copper and the nickel complex were excellent. The cobalt, chromium and cadmium

TABLE II

| Run No. | Copper Solution, ml. | Chemicals | Amount, ml. | Gel Time, minutes | Gel Strength [1] | Color of Gel [2] |
|---|---|---|---|---|---|---|
| 1 | 33 | Trismethylolnitromethane [3] | 15 | ½ | 1 | Dark. |
| 2 | 33 | ____do [4] | 15 | ½ | 1 | Medium. |
| 3 | 25 | U.F. 85 | 7½ | 6 | 4 | Light. |
| 4 | 15 | {37% Formaldehyde / Ethyl Acetate | 7½ / 5 | } 5 | 2 | Very light. |
| 5 | 15 | {37% Formaldehyde / 7.5% NaAlO₂ | 7½ / 18 | } 4 | 5 | Light. |
| 6 | 33 | U.F. 85 | 6 | 4 | 3 | Dark. |
| 7 | 33 | U.F. 85 | 4 | 12 | 3 | Very dark. |
| 8 | 22 | U.F. 85 | 4 | 26 | 5 | Medium dark. |
| 9 | 33 | U.F. 85 | 3 | 13½ | 4 | Very dark. |
| 10 | 16.5 | U.F. 85 | 3 | ------- | 6 | Medium. |
| 11 | 25 | U.F. 85 | 4 | 20 | 5 | Dark. |

[1] This is a relative gel strength, a 1 rating is a hard brittle wax and a 6 rating is a little harder than custard.
[2] The darkness or lightness of the blue color is a rough indicator of the amount of Tetramminecopper (II) sulfate remaining. When all of the Tetramminecopper (II) is gone, a very light blue remains.
[3] $(HOCH_2)_3CNO_2$—a 61.5 gm./100 ml. solution in water, pH adjusted to 8 with NaOH.
[4] Same as above but pH adjusted to 11 with NaOH.

Tris (methylol) nitromethane decomposes to formaldehyde and nitromethane in alkaline solutions. However, the rapid gel time of only one-half minute was apparently caused by the acidity of the nitromethane produced.

In run four, ethyl acetate was used in conjunction with formaldehyde. Hydrolysis of ethyl acetate to make ethyl alcohol and acetic acid to set sodium silicate may be used alone as a method of setting sodium silicate (see U.S. Patent No. 3,202,214). In run five, sodium aluminate was used with the formaldehyde. There was a rapid set but the sodium aluminate did not appear to greatly increase the final strength obtained.

Example III

Several metal complexes were prepared using the following procedure. An amine complex was formed by mixing 180 gms. of metal salt, 450 ml. of water, 420 ml. of 28% NH₄OH solution and enough water to make 1000 ml. of solution. The sodium silicate grouting solution was then prepared by mixing two solutions. The first solution contained 33 ml. of 40 grade sodium silicate, a variable amount of formaldehyde solution, and enough water to make 50 ml. of the first solution. The second solution contained a variable amount of the complex solution prepared as indicated above and enough water to make 50 ml. The two solutions were then added to make the grouting solution. The results are set forth in Table III.

TABLE III

| Complex Solution | U.F.85 in Solution A, ml. | Gel Time | Remarks |
|---|---|---|---|
| Copper | 5 | 8 min | Excellent. |
| Nickel | 5 | 3 hrs | Do. |
| Zinc | 5 | Instant | |
| Cobalt | 5 | 10 min | Instant precipitate of Co(OH)₂ when silicate added. However, gel time is distinct from flocculant precipitate. |
| Chromium | 5 | 10 min | Very similar to cobalt. |
| Cadium | 5 | 10 min | Somewhat similar to cobalt but produced turbid solution instead of precipitate. | containing solutions resulted in a precipitate which was probably the hydroxide of the metal. The precipitate in the cadmium solution was not heavy and would not prevent use of this material.

Example IV

The properties of a gel formed according to the procedure of Example III for copper and nickel were determined in this example. The formaldehyde source was either U.F. 85 or 37% aqueous formaldehyde solution. The results are set forth in Table IV.

TABLE IV

| Run No. | Formaldehyde | | Amount Complex, ml. | Formaldehyde Complex Ratio [1] | Gel Time, minutes | CuSO₄·5H₂O Penetrometer Reading | Gel Time, minutes | NiSO₄·6H₂O Penetrometer Reading |
|---|---|---|---|---|---|---|---|---|
| | Source | Amount, ml. | | | | | | |
| 1 | 37% | 7 | 25 | 0.120 | 9 | 118 | 13 | 92 |
| 2 | 37% | 10 | 25 | 0.160 | 4 | 47 | 3 | 29 |
| 3 | 37% | 12½ | 25 | 0.200 | 2 | 45 | 1 | 33 |
| 4 | U.F. 85 | 4 | 25 | 0.123 | 27 | 100 | 57 | 85 |
| 5 | U.F. 85 | 7 | 25 | 0.218 | 8 | 58 | 18 | 45 |
| 6 | U.F. 85 | 10 | 25 | 0.312 | 4.5 | 47 | 7 | 40 |
| 7 | U.F. 85 | 7 | 15 | 0.364 | 45 | 170 | 61 | 168 |
| 8 | U.F. 85 | 7 | 20 | 0.273 | 13 | 60 | 32 | 92 |
| 9 | U.F. 85 | 7 | 30 | 0.182 | 4 | 35 | 14 | 31 |
| 10 | U.F. 85 | 7 | 35 | 0.156 | 4 | 31 | 13 | 26 |

[1] Grams formaldehyde/ml. complex.

Example V

This example illustrates the use of various carbohydrate complexing agents. Many of these agents will liberate the polyvalent ion slowly and thus do not require the use of a complex destroyer. Two solutions were prepared, the first being a solution of the polyvalent ion complex and the second being a solution of 40 grade sodium silicate. Na₂S₂O₈ was used as a complex destroyer in some of the runs and was included in the sodium silicate solution. Various methods of adding the two solutions were employed. In one method, the two solutions were poured together and in another method, the complex containing solution was injected into the sodium silicate containing solution with a syringe. The injection method appeared to produce better results. The results are set forth below in Table V. The presence of initial nonuniform gelling, "flockballs," may be undesirable and was noted in this experiment.

Data

The data are presented in the following table:

Code:
AJB—Solution A injected into Solution B with a syringe.
APB—Solution A poured into Solution B.
BPA—Solution B poured into Solution A.
X—A solution of 0.2 gm./ml. Na₂S₂O₈.
Z—A solution of 0.1 gm./ml. Na₂S₂O₈.
40SS—Diamond Alkali 40 Grade Sodium Silicate (41° Bé, Na₂O:SiO₂=1:322)
CaCit—Calcium Citrate.
SEDTA—Sodium Ethylenediaminetetraacetate.
STP—Sodium Tripolyphosphate.

NTA—Nitrilotriacetic Acid.
CaL—Calcium Lactate.
CaAc—Calcium Acetate.
FA—Formamide.
ETAc—Ethyl Acetate.

All tests and all solutions were at 72° F.

TABLE V

| Run No. | Component Solution A | Composition Solution B | Mixing Mode | Flock-Balling | Gel Time | Gel |
|---|---|---|---|---|---|---|
| 1 | 2.8 gm. CaO, 13 gm. Sucrose, 50 ml. H$_2$O. | 17 ml. H$_2$O, 10 gm. Na$_2$S$_i$O$_3$, 33 ml. 40 SS. | APB | Moderate | 1 min | Hard. |
| 2 | 2.8 gm. CaO, 13 gm. Sucrose, 50 ml. H$_2$O. | 17 ml. H$_2$O, 33 ml. 40 SS | APB | Slight to Moderate | 10 min | Do. |
| 3 | 2.8 gm. CaO, 15 gm. Mannitol | 17 ml. H$_2$O, 33 ml. 40 SS | APB | Moderate | 12 min | Do. |
| 4 | 2.8 gm. CaO, 15 gm. Mannitol | 17 ml. H$_2$O, 33 ml. 40 SS | AJB | Slight to Moderate | 14 min | Do. |
| 5 | 2.8 gm. CaO, 15 gm. Sucrose, 35 ml. H$_2$O. | 50 ml. H$_2$O, 50 ml. 40 SS | APB | do | 20 min | Do. |
| 6 | 2 gm. CaO, 15 gm. Sucrose, 100 ml. H$_2$O. | 50 ml. H$_2$O, 5 gm. Na$_2$S$_i$O$_3$ | APB | Slight | 71 min | Medium hard. |
| 7 | 2.8 gm. CaO, 20 gm. Dextrose, 50 ml. H$_2$O. | 50 ml. H$_2$O, 50 ml. 40 SS | AJB | Moderate | 30 min | |
| 8 | 10 gm. Dextrose, 50 ml. H$_2$O | 50 ml. X, 50 ml. 40 SS | BPA | None | 2½ hours | Medium. |
| 9 | 10 gm. Dextrose, 1 gm. CaO, 50 ml. H$_2$O. | 50 ml. X, 50 ml. 40 SS | BPA | Moderate | 30 min | Medium hard. |
| 10 | 10 gm. CaCit, 10 gm. Dextrose, 50 ml. H$_2$O. | 50 ml. X, 50 ml. 40 SS | BPA | (¹) | 5 min | Hard. |
| 11 | 10 gm. Dextrose, 1 gm. CaO, 50 ml. H$_2$O. | 50 ml. Z, 50 ml. 40 SS | AJB | Slight | 24 min | Medium hard. |
| 12 | 10 gm. Dextrose, 2 gm. CaCl$_2$, 50 ml. H$_2$O. | 50 ml. Z, 50 ml. 40 SS | AJB | Very heavy | | |
| 13 | 10 gm. Dextrose, 4 gm. CaCl$_2$, 10 ml. NH$_4$OH. | 50 ml. Z, 50 ml. 40 SS | AJB | (¹) | Instant | Hard. |
| 14 | 15 gm. Sucrose, 1.5 gm. CaO, 50 ml. H$_2$O. | 50 ml. X, 50 ml. 40 SS | AJB | Moderate | 7 min | Do. |
| 15 | 15 gm. Dextrose, 1.5 gm. CaO, 50 ml. H$_2$O. | 50 ml. X, 50 ml. 40 SS | AJB | do | 2 min | Do. |
| 16 | 15 gm. Sucrose, 1 gm. CaO, 50 ml. H$_2$O. | 50 ml. Z, 50 ml. 40 SS | AJB | None | 23 min | Medium. |
| 17 | 20 gm. SEDTA, 10 gm. Sucrose, 2 gm. CaO, 30 gm. H$_2$O. | 50 ml. X, 50 ml. 40 SS | BPA | do | 13 min | Hard. |
| 18 | 15 gm. Dextrose, 1.5 gm. CaO, 50 ml. H$_2$O. | 50 ml. X, 50 ml. 40 SS | BPA | Very heavy | 30 min | Do. |
| 19 | 10 gm. NTA, 10 gm. STP, 2 gm. CaO, 50 ml. H$_2$O. | 50 ml. X, 50 ml. 40 SS | BPA | None | 3 hrs | Do. |
| 20 | 10 gm. STP, 10 gm. Sucrose, 2 gm. CaO, 50 ml. H$_2$O. | 50 ml. X, 50 ml. 40 SS | BPA | do | 3 hrs | Medium hard. |
| 21 | 3 gm. CaL, 50 ml. H$_2$O | 50 ml. H$_2$O, 50 ml. 40 SS | BPA | Moderate | 3 hrs | Very soft. |
| 22 | 2 gm. CaAc, 50 ml. H$_2$O | 50 ml. H$_2$O, 50 ml. 40 SS | BPA | do | 96 min | Soft. |
| 23 | 10 gm. SEDTA, 10 gm. Dextrose, 2 gm. CaO, 50 ml. H$_2$O. | 50 ml. Z, 50 ml. 40 SS | BPA | None | 1 min | Medium hard. |
| 24 | 10 gm. FA, 2 gm. CaO, 50 ml. H$_2$O. | 50 ml. H$_2$O, 50 ml. 40 SS | BPA | None | 58 min | Hard. |
| 25 | 10 gm. ETAc, 2 gm. CaO, 50 ml. H$_2$O. | 50 ml. H$_2$O, 50 ml. 40 SS | BPA | do | 30 min | Very hard. |
| 26 | 15 gm. Sucrose, 1 gm. CaO, 50 ml. H$_2$O. | 50 ml. X, 50 ml. 40 SS | BPA | Very heavy | 18 min | Hard. |
| 27 | 15 gm. Sucrose, 1.5 gm. CaO, 50 ml. H$_2$O. | 50 ml. X, 50 ml. 40 SS | BPA | do | 8 min | Do. |
| 28 | 15 gm. Dextrose, 1.0 gm. CaO, 50 ml. H$_2$O. | 50 ml. X, 50 ml. 40 SS | BPA | do | 13 min | Do. |
| 29 | 15 gm. Dextrose, 1.5 gm. CaO, 50 ml. H$_2$O. | 50 ml. X, 50 ml. 40 SS | BPA | Very heavy (paste) | 7 min | Medium hard. |
| 30 | 15 gm. Dextrose, 1.0 gm. CaO, 50 ml. H$_2$O. | 50 ml. H$_2$O, 50 ml. 40 SS | BPA | Medium | 104 min | Soft. |
| 31 | 15 gm. Dextrose, 1.5 gm. CaO, 50 ml. H$_2$O. | 50 ml. H$_2$O, 50 ml. 40 SS | BPA | Very heavy | 45 min | Do. |
| 32 | 15 gm. Sucrose, 1.0 gm. CaO, 50 ml. H$_2$O. | 50 ml. H$_2$O, 50 ml. 40 SS | BPA | Medium | 66 min | Do. |
| 33 | 15 gm. Sucrose, 1.5 gm. CaO, 50 ml. H$_2$O. | 50 ml. H$_2$O, 50 ml. 40 SS | AJB | Slight | 17 min | |
| 34 | 15 gm. Dextrose, 1.0 gm. CaO, 50 ml. H$_2$O. | 50 ml. X, 50 ml. 40 SS | AJB | Medium | 9 min | Hard. |
| 35 | 15 gm. Dextrose, 0.75 gm. CaO, 50 ml. H$_2$O. | 50 ml. X, 50 ml. 40 SS | AJB | None | 39 min | Do. |

¹ Could not be determined.

The above examples are merely intended as illustrative of the invention and are not intended to be limiting. Thus, it can be seen by those skilled in the art that many variations, both as to composition and method of mixing and incorporating the silicate solution can be made without departing from the scope of this invention. Furthermore, it can be seen that various complex and combinations of complexes can be used with polyvalent ions. Furthermore, the complexes may be used with or without a complex destroyer to slowly liberate polyvalent ions and the desired gel time. Therefore, the invention should be limited only by the lawful scope of the appended claims.

We claim:
1. A sealing composition comprising a sodium silicate, a polyvalent metal complex and a chemical complex destroyed which reacts with said complex whereby the polyvalent ion in said complex is slowly liberated.
2. The composition of claim 1 wherein the material capable of destroying the complex is an oxidizing agent.
3. The composition of claim 1 wherein the complex is an ammine complex.
4. The composition of claim 3 wherein the complex is a copper-ammine complex.
5. The composition of claim 3 wherein the complex is a nickel-ammine complex.
6. The composition of claim 3 wherein a formaldehyde is present as a complex destroyer.
7. The composition of claim 3 wherein an aldehyde is present as a complex destroyer.
8. The composition of claim 1 wherein the complex is a polyvalent ion complexed with a complexing agent selected from the group consisting of sucrose, dextrose, mannitol, sodium ethylenediaminetetraacetate, nitrilotriacetic acid, formamide, urea, and ethylacetate and mixtures thereof.
9. The composition of claim 8 wherein the complex is a calcium-sucrose complex.
10. The composition of claim 8 wherein the complex is a calcium-dextrose complex.
11. The composition of claim 8 wherein an oxidizing agent is present as a complex destroyer.
12. A method of plugging or sealing earth formations and the like, comprising the step of introducing into the earth formation to be sealed, a sodium silicate solution, a polyvalent metal complex and a chemical complex destroyer which reacts with said complex whereby the polyvalent metal ion in said complex is slowly liberated to thereby cause setting of the sodium silicate solution.

13. The method of claim 12 wherein the material capable of destroying the polyvalent meal is an oxidizing agent.

14. The method of claim 12 wherein the complex is an ammine complex.

15. The method of claim 14 wherein the complex is a copper-ammine complex.

16. The method of claim 14 wherein the complex is a nickel-ammine complex.

17. The method of claim 14 wherein formaldehyde is added as a complex destroyer.

18. The method of claim 14 wherein an aldehyde is added as a complex destroyer.

19. The method of claim 12 wherein the complex is a polyvalent ion complexed with a complexing agent selected from the group consisting of sucrose, dextrose, mannitol, sodium ethylenediaminetetraacetate, nitrilotriacetic acid, formamide, urea, and ethylacetate and mixtures thereof.

20. The method of claim 19 wherein the complex is a calcium-sucrose complex.

21. The method of claim 19 wherein the complex is a calcium-dextrose complex.

22. The method of claim 19 wherein an oxidizing agent is present as a complex destroyer.

References Cited
UNITED STATES PATENTS

| | | | |
|---|---|---|---|
| 2,208,766 | 7/1940 | Lawton | 166—29 |
| 2,302,913 | 11/1942 | Reimers | 166—29 X |
| 2,827,384 | 3/1958 | Freyhold | 106—74 |
| 2,968,572 | 1/1961 | Peeler | 106—74 |
| 3,202,214 | 8/1965 | McLaughlin | 166—29 X |
| 3,294,563 | 12/1966 | Williams | 106—74 |

STEPHEN J. NOVOSAD, Primary Examiner.

U.S. Cl. X.R.

61—36; 106—80

UNITED STATES PATENT OFFICE
CERTIFICATE OF CORRECTION

Patent No. 3,435,899                      April 1, 1969

Homer C. McLaughlin et al.

It is certified that error appears in the above identified patent and that said Letters Patent are hereby corrected as shown below:

Column 2, line 46, cancel "$(Cr(NH_3)_5NO_2)Cl_2$" and insert the same at the end of line 45, same column 2. Column 3, line 25, "ammine" should read -- amine --. Columns 5 and 6, TABLE IV, third column, line 1 thereof, "7" should read -- 7 1/2 --. Columns 7 and 8, TABLE V, sub-heading to the fifth column, "Flock-Balling" should read -- Flockballing --. Column 7, line 73, "destroyed" should read -- destroyer --. Column 9, line 6, "meal" should read -- metal --.

Signed and sealed this 14th day of April 1970.

(SEAL)
Attest:

Edward M. Fletcher, Jr.                  WILLIAM E. SCHUYLER, JR.
Attesting Officer                           Commissioner of Patents